Jan. 1, 1957 J. E. HINTON 2,775,822
MEASURING TAPE HOLDER
Filed Jan. 15, 1954
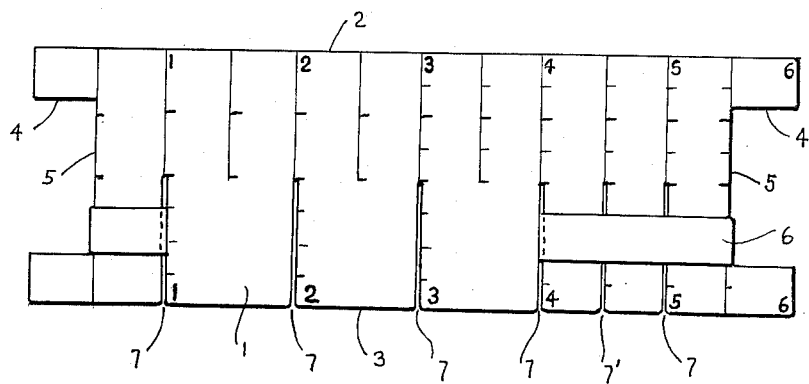
INVENTOR.
JOHN E. HINTON
BY
ATTORNEY.

United States Patent Office 2,775,822
Patented Jan. 1, 1957

2,775,822

MEASURING TAPE HOLDER

John E. Hinton, Hazelton, Idaho

Application January 15, 1954, Serial No. 404,254

1 Claim. (Cl. 33—190)

This invention relates to a combination ruler, tape measure holder and button hole marker.

The principal object of the present invention is to provide a novel combination ruler, tape measure holder and button hole marker particularly adapted for a seamstress whereby measurements may readily be made, a tape measure held securely in place, and markings for button holes easily made.

Another object is the provision of such a combination device having means for winding a tape measure therearound and having means for anchoring and securing the ends of the tape measure in place.

Another object is to provide a transparent plastic combination ruler, tape measure holder and button hole marker having slots arranged along one edge to enable button hole measurements to be made.

These and other objects will be apparent by referring to the accompanying specification and drawings wherein Figure 1 is a plan view of my novel combination ruler, tape measure holder and button hole marker.

Referring more particularly to the drawings, numeral 1 designates a substantially flat, relatively thin, substantially rectangular body of some suitable transparent material, such as plastic. The body is provided with two parallel straight edges 2 and 3, each of which is graduated in inches from 1 to 6. Each end of the body 1 is cut inwardly, as at 4, to provide inset straight edges 5 to engage and support a conventional tape measure 6 of fabric or other material. The tape measure 6 may be wrapped around the flat body 1 and will flatly engage the latter and bear against the edges 5. Because the edges 5 are inset from the ends of the body, it will be seen that the tape measure will not project beyond the ends of the body. Slots 7 are formed along the straight edge 3 which slots extend through the flat body 1 and project along the inch graduations to a point substantially midway between the straight edges 2 and 3. Another slot 7' is correspondingly formed at some suitable point along the straight edge 3, for example along the line designating 4½ inches. Thus, when the tape measure 6 is wound around the body 1, the ends of the measure may be inserted beneath two or more of the slots 7, or the slot 7', so that the tape measure will be firmly retained in position and will not unravel therefrom.

In addition to serving as a means for securing the ends of the tape measure in place, the slots 7 are so arranged approximately one inch apart so that when the flat body is placed on a garment being made, the seamstress may readily insert a pin or some other suitable marking device, not shown, through the slots and into the material to mark places where the button holes are to be formed, in an obvious manner. As the body 1 is substantially flat and is formed of transparent plastic material, it will be apparent that the same may be flatly disposed upon a garment or other material so that the latter will be clearly visible to the person using the device. Consequently, this is a multi-type purpose device in that it serves as a measuring straight edge, holder for a tape measure, and a button hole marker, in addition to which the device renders the material to which it is applied clearly visible at all times.

While I have shown and described a preferred embodiment of my invention, it will be understood that various changes and improvements may be made without departing from the scope and spirit of the appended claim.

Having thus described my invention, what I claim is:

A combination ruler, tape measure holder and button hole marker comprising a relatively flat, substantially rectangular, transparent plastic body, the ends of said body being inset to enable a tape measure to be wound longitudinally therearound, said body having parallel side straight edges with measuring graduations therealong, one of said edges having spaced slots extending transversely along some of said graduations to enable button hole measurements to be made, said slots having measuring graduations therealong whereby to measure button hole length said slots also serving to receive the ends of said tape measure to anchor the latter into position.

References Cited in the file of this patent

UNITED STATES PATENTS

| 353,064 | Huffer | Nov. 23, 1886 |
| 787,974 | Clark | Apr. 25, 1905 |
| 897,173 | Strassberger | Aug. 25, 1908 |
| 933,189 | Linnell | Sept. 7, 1909 |
| 2,250,718 | McCloud | July 29, 1941 |

FOREIGN PATENTS

| 11,798 | Great Britain | 1906 |